April 2, 1946.  G. D. BOWER  2,397,465

TWO-STAGE CONTROL

Filed March 27, 1942

INVENTOR:
GEORGE D. BOWER,
By Kingsland, Rogers & Ezell
ATTORNEYS.

Patented Apr. 2, 1946

2,397,465

UNITED STATES PATENT OFFICE 2,397,465

TWO-STAGE CONTROL

George D. Bower, University City, Mo., assignor to Automatic Control Corporation, St. Louis, Mo., a corporation of Delaware Application March 27, 1942, Serial No. 436,445

16 Claims. (Cl. 236—9)

This invention relates to a temperature-responsive control, and more particularly to a so-called "two-stage control."

It has for its objects the provision of a control giving two stages of operation to a furnace or the like, one stage at a relatively low temperature of the furnace, and the other stage at a relatively high temperature thereof.

A further object is to provide a control for a burner or the like, that causes the burner to operate within one range of temperature upon one heat condition, and to operate within another range of temperature at another condition. A further object is to cause this control to be affected by the rate of response of the space being heated to the heat supplied thereto by the burner; or stated differently, the object is to attain two-stage control dependent to a considerable extent upon the length of time the space thermostat is closed.

More exactly, it is an object of the invention to provide a two-stage control adapted to give two temperature conditions of operation for a burner, and with means to select the stage, which means is operated as a function of the time the space being heated remains below the desired temperature.

A further object of the invention is to provide a multi-stage burner providing relatively low heat and relatively high heat, with a room or space thermostat having a single stage for controlling the same.

A further object of the invention is to provide a control giving a low range of operation and a high range of operation, with provision giving high range operation at the same room temperature as low range operation.

Figure 1:
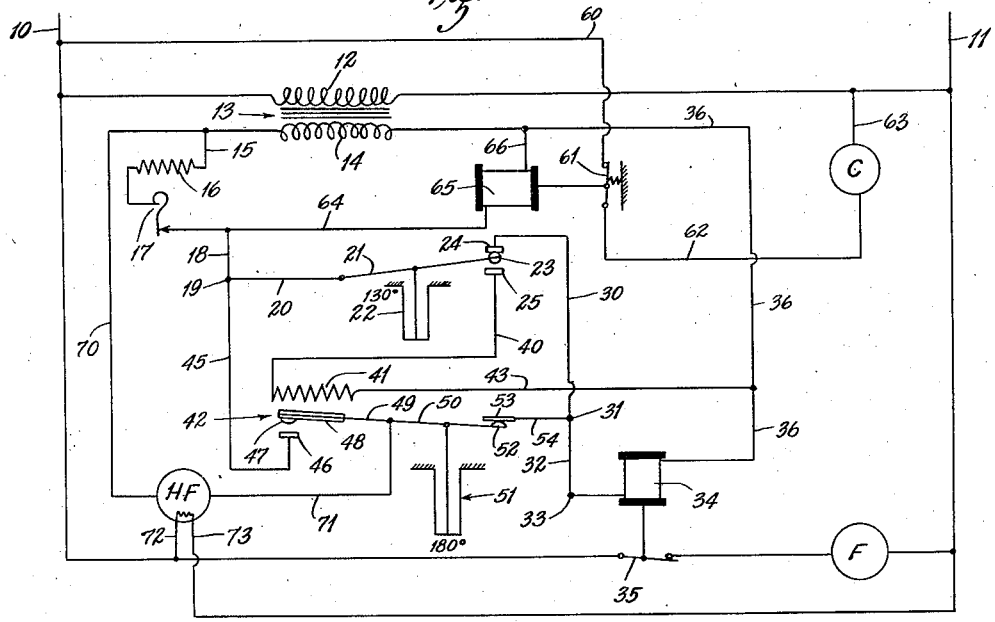
Figure 2:
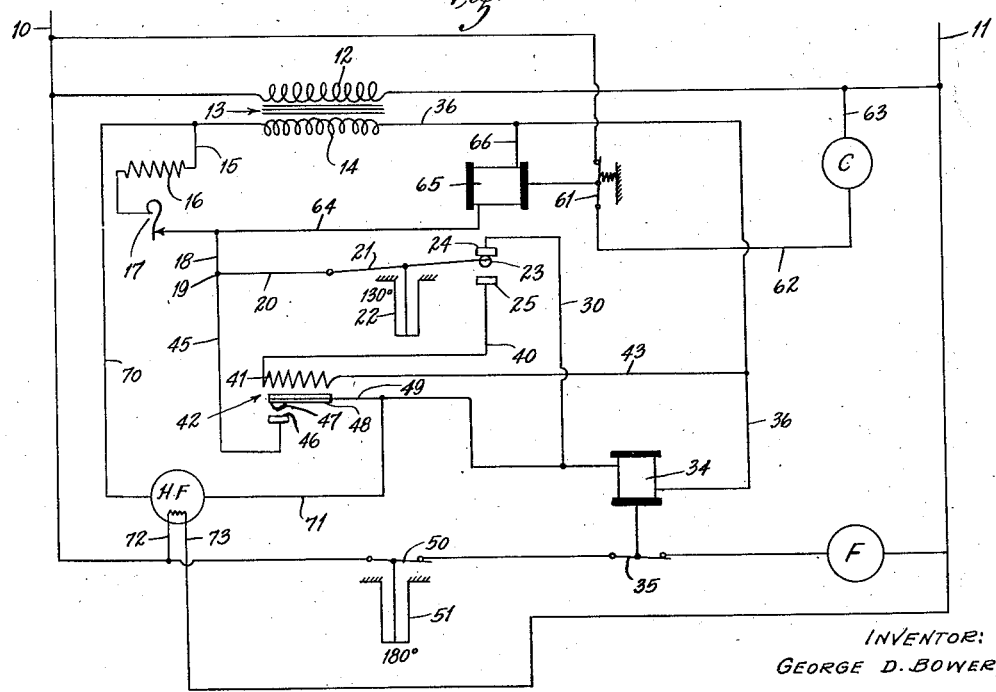

In the drawing Fig. 1 shows a wiring diagram of the invention in connection with a stoker motor, gas or oil valve adapted to be connected to a furnace, or the like, and Fig. 2 shows a modified form of the invention.

The two lines 10 and 11 are connected to a suitable power source and have a primary winding 12 of a transformer 13 across them.

A secondary winding 14 provides energy for a low voltage circuit. One lead 15 from the secondary goes through an anticipating heater 16 to a space or room thermostat switch 17. From the room thermostat a lead 18 extends to a junction 19. From the junction 19, a lead 20 extends to a movable blade 21 of snap-action thermostat 22; here shown as being of the rod and tube type. As shown, the tube of the thermostat 22 expands longitudinally upon increase in temperature and the rod does not change in length.

The blade 21 has thereon a two-way contact 23 that, in the cold position, makes with a fixed contact 24 and, in the hot position, makes with a fixed contact 25. A typical snap-action mechanism that may be employed is shown in the patent to Lawrence M. Persons, No. 2,180,018. To this end, the blade 21 is somewhat flexible.

The contact 24 has a lead 30 extending to a junction point 31 from whence an additional lead 32 extends to a junction 33 connected with the coil 34 operating a switch 35, closed upon energization of the coil. The other lead 36 from the coil 34 extends to the other side of the secondary 14. The switch 35 closes in a high voltage circuit to energize a fuel supply device F, that may be a stoker motor, an oil valve, or the like.

From the contact 25 of the thermostat 22, a lead 40 extends to a heater 41 of a heat relay, generally designated at 42, from which heater 41, extends a lead 43, passing to the lead 36 for connection with the secondary.

A high limit circuit extends from the junction 19, and comprises a lead 45 extending to a contact 46 of the heat relay 42. This contact 46 can make with a contact 47 on a bimetallic blade 48 designed to close the contacts 46 and 47 upon sufficient application of heat from the heater 41. The blade 48 is connected by a lead 49 to the blade 50 of a second thermostat 51. The blade 50 has thereon a contact 52 adapted to be closed with contact 53 when the thermostat 51 is cold. The contact 53 is connected by a lead 54 to the junction 31.

The room thermostat 17, in a heating system, closes when cold. The limit switch 22, when cold, makes the contacts 23 and 24 (designated "switch 24"), but when hot, makes the contacts 23 and 25 (designated "switch 25"). This is called a low limit control and is designed to operate upon increase in some value such as 130°, and upon decrease in temperature with some differential which may be great or small and which for illustration will be assumed to close switch 24 upon fall in temperature to 110°. The thermostat 22 is adapted to be disposed in some place responsive to the temperature of the heating unit, such as within the bonnet thereof.

The thermostat 51, called the high limit, may be set to open at a temperature of 180°, for example, and is also provided with a differential to cause it to reclose at a lower value, such as 150°. This thermostat 51 is disposed so as to be responsive to the temperature of the heating unit and may be within the bonnet. The heater 41 is such as to close the switch 42 after having been energized for a period of time, such as eight or ten minutes, from a cold start. All of these values are, of course, subject to change to accord with the particular circumstances of the use of the device. A suitable adjustable differential switch is found in Muchow Patent 2,291,554, issued July 28, 1942.

A circulator is also shown, which may be illustrated as a hot water circulator, used when this control is employed in a hot water system. It comprises a circulating device C having a lead 60 connected with power line 10. The lead 60 extends to a switch 61, from which switch a lead 62 extends to the circulator. A return wire 63 connects into the other power line 11.

The switch 61 is operated by a low-voltage circuit. It includes a line 64 leading from the thermostat 17 into a coil 65, from which a return lead 66 connects into the secondary. The coil 65 is energized to close the switch 61 whenever the thermostat closes demanding heat.

There is also provided a hold-fire circuit, for use where the mechanism F represents a stoker motor. This hold-fire is a time-controlled circuit adapted to charge the furnace at intervals to prevent the fire from going out. It includes a lead 70 connected to the secondary, running to a timing switch HF, from which a lead 71 extends to the line 50 ahead of the high limit switch 51. The clock motor of the hold-fire is connected to the power lines 10 and 11 by connections 72 and 73, and at selected intervals closes the circuit from line 70 to line 71 in a familiar manner.

*Operation*

There are three conditions of operation produced by this control, aside from the hold-fire. The first is in mild weather, where the heat-loss rate of the space heated is relatively low. The second is in intermediate weather. The third is in cold weather, wherein the heat-loss rate from the space is relatively high. These three are produced by what is termed a "two-stage" control, but the term is used in a sense to comprehend a third stage between the two, during which the furnace is inactive.

For the first condition, assume a cold system, just starting. The thermostat 17 will be closed, thermostat 22 will engage the contacts 23—24, and the coil 34 will be put in circuit. This closes the switch 35 to put the furnace means F in operation, to supply heat. This circuit, including secondary 14, anticipator 16, thermostat 17, junction 19, blade 21 of thermostat 22, contacts 23—24, line 30, coil 34 and return 36, will remain closed as long as both thermostats 17 and 22 remain as indicated.

If the heat supplied at the low furnace temperature, of 130° F., for instance, is sufficient to heat the room, and the thermostat 17 opens before the furnace has been operating so long that it exceeds that low 130° temperature, the coil 34 will be deenergized, and the furnace will stop.

For the second condition, of intermediate weather, the first circuit is closed through the low limit switch in its colder position, closing contacts 23—24. If the room is not heated sufficiently to open the thermostat switch before the low limit 22 shifts contact 23 from the contact 24 to the contact 25, this last shift will release the coil 34, cut off the furnace, and energize the heater 41. The circuit for the latter is from the secondary 14 through anticipator 16, thermostat 17, junction 19, low limit 22, contacts 23—25, heater 41 and return 36 to the secondary.

At this time, there is no new heat being supplied, but the residual heat built up in the furnace may be sent to the room during an interval of time in which the heater 41 is coming up to the temperature at which it will ultimately cause closing of the contacts 46—47. In intermediate weather, this residual heat may be sufficient to cause opening of the thermostat 17 before the heat switch 42 closes, whereupon the mechanism will again be deenergized.

The third condition involves cold weather. If the demand for heat is so continuous that the low limit exceeds 130° and shifts to close contacts 23—25, and the heater 41 remains energized long enough to close the switch 42, the coil 34 will again be put in circuit to cause the furnace to start. This circuit is dependent upon the room thermostat 17, the heat relay 42, and the high limit switch 51 in cold position. If the high limit exceeds its setting, of 180° for instance, it will open contacts 52—53. This will stop the furnace, but the heat relay 42 will remain closed, as the heater 41 remains in circuit through the low limit switch contacts 23—25 independently of the high limit 51. When the furnace subsequently cools to reclose the high limit switch 51, the furnace will start again.

Where the anticipator 16 is not used at all, the above cycles will occur. Its affect upon them requires some consideration.

In the first condition, mild weather, the room may heat rapidly and cool slowly. In such case, the anticipator will cause opening of the room thermostat after a time corresponding to part of the time required to heat the room the amount of the differential. For instance, the anticipator may open the thermostat at 71° actual room temperature on a cold-hot differential setting of 70°–73° F. Thereafter residual heat in the furnace may bring the room up the remaining two degrees, to 73°.

Owing to a low heat-loss rate in mild weather, the heat drop is slow. When the thermostat drops to 70°, it will reclose, and owing to the slow heat-loss rate, the room will start heating upwardly with negligible drop below 70° caused by furnace lag.

The anticipator is energized a relatively brief interval in such mild weather, and the furnace is also in operation a relatively short time. The time required to open the thermostat 17 is always a function of the heat produced by the anticipator and of the heat produced by the furnace and delivered to the thermostat. This combination of times in mild weather is such that the thermostat will open before the furnace has operated long enough to open the low limit switch 22.

In the second condition, intermediate weather, the heat-loss from the room is greater, and as a result it takes longer to get the room up to a temperature to open the thermostat 17. However, this means that the component of heat produced by the furnace and delivered to the thermostat is slower in reaching the critical value; but at the same time, the anticipator remains energized longer. The time required to open the thermostat is long enough to enable the furnace to heat above 130° and to shift the low limit 22 to close with the contact 25, temporarily stopping the furnace. Since, however, the heater 41 requires a predetermined interval to close the switch 42, in medium weather the residual heat in the furnace will be sufficient to bring the thermostat up to an opening temperature prior to closing of the heat relay switch 42.

It may be observed that after the low limit has shifted to close contact 25, the furnace stops but the anticipator remains in circuit, in series with the heater 41. Being thus in series, its heat is dependent upon the resistance of the heater 41, which may be greater or less than that of the coil 34. If greater, the anticipator will have a reduced tendency to open the thermostat 17 after the low limit has shifted. If lesser, the anticipator will have an increased tendency to open the thermostat 17 after the low limit has shifted. By thus controlling, in the well-known manner, the relative resistances, using the term in its broad sense of any impedance etc. to current flow of the heater and coil, the opening of the thermostat 17 may be hastened or retarded after the switch 25 has closed. The anticipator must not, however, become so strong as to open the thermostat 17 before the switch 42 can close, regardless of other heat conditions at the thermostat 17. A fast anticipator that forces the thermostat 17 open in a relatively short time may be provided for mild weather, but this fast anticipator will be slowed down for colder weather if increased resistance is provided in the heater 41 over that in the coil 34. For example, the anticipator may act rapidly to prevent the furnace from remaining on over five minutes during mild weather, but may permit an interval of ten minutes after the switch 25 has closed.

In the third condition, very cold weather, the rate of heat-loss is greater still, and the rate of temperature increase of the bimetal of thermostat 17 is slower, it being subjected to the heat from the anticipator and that produced by the furnace. The anticipator heat accumulates with increased time in circuit, but the heat from the furnace comes in lesser quantities due to the greater loss. The thermostat 17 opens only when the sum of the anticipator and room heat reaches the value for which it is set.

Longer time to open the thermostat means, first, a passage of sufficient time to shift the low limit 22, as described in connection with the second condition. In cold weather, it means also the passage of sufficient time to permit the heater 41 to close the switch 42. This last restarts the furnace, from an already heated condition. The furnace may then normally heat up above the value of the high limit before the thermostat 17 opens, and continue to cycle on the high limit switch 51 until the anticipator 16 overrides the air temperature and opens the thermostat 17. This may not occur for several cycles.

When the high limit circuit is closed, the anticipator may pass more current, owing to its carrying parallel circuits through the heater 41, and the high limit with the coil 34. If the thermostat opens under the dominating influence of the anticipator (or because satisfied for any reason), the furnace will of course stop. The point in the cycle for a restart will depend upon the rate of heat loss from the room, and how quickly the closing temperature can be reached by the thermostat 17. It may reclose before the low limit 22 has opened the switch 25, in which case, if the switch 42 closes before additional time causing shifting of the low limit, recycling on the high limit will occur. If the recycle starts quickly, residual heat in the heater 41 will cause a rapid reclosing of the switch 42.

Under some conditions, the thermostat 17 might reclose before the relay 42 has opened.

The presence of the circulator C does not alter the cycles above described, as it is in a line voltage circuit whenever the thermostat 17 is closed. However, its relay coil 65 is supplied through the anticipator at all times when the thermostat is closed which will tend to decrease the percentage changes occurring during the aforementioned program. The hold-fire offers no change to the current in the anticipator circuits.

The timing of the heat relay 42 should be sufficient to compensate for a large percentage of the lag in the system. Therefore, it is much shorter for a warm air forced draft system than with a gravity flow of hot-water system.

For quick action, the relay 42 might have the familiar slip friction clutch.

With the greater anticipating effect in the high temperature range, owing to greater current through the anticipator, the greater lag in the system that is present in cold weather is to a greater degree compensated for.

An alternative construction is shown in Fig. 2, which differs from Fig. 1 only in that the high limit switch 50 is located directly in the high voltage line. This protects against sticking relays and the like, as the high circuit switch may always open and completely cut off the furnace unit F, independently of the rest of the circuit.

From the foregoing it may be seen that a multistage operation is obtained that is a function of time and rate of heat dissipation, rather than by extra thermostat drop, or extra drop in the room temperature. If the heat-loss from the room is so rapid that the boiler reaches the low limit temperature before the thermostat opens, the control automatically swings to the high limit operating sequence even though the temperature at the thermostat has not dropped any lower.

It will be further observed that this operation is obtained by a single pole, single throw type of thermostat.

What is claimed is:

1. In a mechanism of the kind described for use with a heating means comprising a heat-producing device, a single acting space thermostat switch, a plurality of circuits including said switch and the heating means, the first circuit including means to effect operation of the heating means at a low rate of heat production, the second circuit including means to effect operation of the heating means at a high rate, said means in the first circuit being operable upon persistent demand for heat to open the first circuit and means operable upon continued demand after said opening to close the second circuit.

2. In a mechanism of the kind described for use with a heating means comprising a heat-generating device, a space thermostat switch adapted to close at a predetermined temperature, a plurality of circuits through said switch, each adapted to operate the heating means, a heat-responsive means disposed to effect closure of one circuit when the heating means is at one heat-generation temperature and alternately to effect opening of said one circuit and to close in a second circuit when the heating means is at a second higher temperature, and means to delay closure of the second circuit for an interval after opening of the first.

3. In a mechanism of the kind described for use with a heating means, a space thermostat switch adapted to close at a predetermined temperature, a first heat-responsive means subjected to heat of the heating means, a second heat-responsive means subjected to the heat of the heating means, one of said heat-responsive means being operable at a higher temperature than the other, two circuits for the heating means, both including the space thermostat and each of the two including one of said heat-responsive means, said first heat-responsive means being adapted to open its circuit at a first temperature, and the second heat-responsive means being adapted to open its circuit at a second temperature higher than the first, and means to prevent closure of the higher temperature circuit for an interval after opening of the low temperature circuit.

4. In a mechanism of the kind described for use with a heating means, a space thermostat switch adapted to close at a predetermined temperature, a first heat-responsive means subjected to heat of the heating means, a second heat-responsive means subjected to the heat of the heating means, one of said heat-responsive means being operable at a higher temperature than the other, two circuits for the heating means, both including the space thermostat and each of the two including one of said heat-responsive means, and means to prevent closure of the higher temperature circuit for an interval after opening of the low temperature circuit, said last-named means comprising a delayed action relay, and a circuit therefor adapted to be energized when the low temperature heat-responsive means is operated to open position.

5. In a mechanism of the kind described for use with a heating means, a space thermostat switch adapted to close at a predetermined temperature, first and second heat-responsive means disposed to respond to heat produced by the heating means, a heat relay comprising a heater and a heat-responsive switch, a first circuit including the thermostat and the first heat-responsive means in cold position, a second circuit including the thermostat, the first heat-responsive means in hot position and the heat relay heater, and a third circuit including the heat-responsive switch of the heat relay, and the second heat-responsive means, said heat-responsive means being adapted to operate at different temperatures, said first and third circuits being adapted to control the heating means and said second circuit being adapted to control the time of closing of the second circuit.

6. In a mechanism of the kind described for use with a heating means to supply heat to a space, means to operate the heating means at a low rate of heat delivery, means to operate the heating means at a high rate of heat delivery, a thermostat controlling both operating means, means to prevent said high rate operating means from effecting operation of said heating means for an interval after said low rate means has become inoperative, biasing means to bias the thermostat toward satisfied condition, operable when the thermostat is in unsatisfied condition, means rendering said biasing means effective in a first amount during operation of said low-rate means, means rendering the biasing means effective in a different amount during the interval after said low-rate means has become ineffective, and means rendering the biasing means effective in a greater amount during operation of the high-rate means.

7. In a mechanism of the kind described for use with a burner device, a space thermostat subjected to temperature of the space to be heated, a high limit switch adapted to shift at a predetermined high temperature produced by the burner, a low limit switch adapted to shift at a predetermined low temperature produced by the burner, means including the space thermostat, the low limit before shifting, and dependent upon the high limit unshifted, to cause operation of the burner device, and means dependent upon the low limit after shifting to delay operation of the burner device for an interval and thereafter to cause operation of the burner device subject to the high limit unshifted.

8. In a mechanism of the kind described for use with a heating means for heating a space, a space thermostat responsive to heat produced by the heating means in the space, a heating means thermostat operable from a cold position to a hot position upon increase in temperature of the heating means itself, means operated with the space thermostat in heat-demanding position and the heating means thermostat in cold position to effect operation of the heating means, the heating means thermostat being adapted to stop the heating means by shifting to hot position, means operated with the heating means thermostat in hot position to maintain the heating means inoperative for a second interval, and then with the heating means thermostat in hot position to restart the same.

9. In a mechanism of the kind described for use with a heating means for heating a space subject to heat loss, a space thermostat in the space, means to operate the heating means at a first and low heating capacity, means to operate the heating means at a second and higher heating capacity, means to render the first means operative upon heat demand at the thermostat for a first period and then to render same inoperative, and means, including the space thermostat in heat-demanding condition, responsive to operation of the heating means for a predetermined time, to render the second means operative for a greater period than the first one, and means to prevent actuation of the heating means by the second means for an interval after the first means has been rendered inoperative.

10. In a mechanism of the kind described for use with a heating means for heating a space, a thermostat in said space, an anticipating heater for the thermostat, a first circuit including the thermostat in operating position and the anticipator, for effecting operation of the heating means at one heating rate, a second circuit means including the thermostat in operating position and the anticipator for effecting operation of the heating means at a second higher heating rate, said second circuit means having means causing a greater amount of current to pass through the anticipating heater than the first circuit provides, and said anticipator being disposed to provide heat to move the thermostat toward inoperative position whenever the anticipator is energized.

11. In a mechanism of the kind described for use with a heating means for heating a space, a space thermostat in the space, an anticipating heater in said space and positioned to apply heat to the space thermostat, an actuating means of predetermined resistance for controlling operation of the heating means, a limiting means for limiting the heating capacity of the heating means, said limiting means being adapted to operate a switch from a first to a second position when the heating means attains a predetermined maximum heating capacity, a relay including an operating means of predetermined resistance and a switch, a plurality of circuits all including the space thermostat and the anticipating heater, the first circuit including also the limiting means in first position and the actuating means, and adapted to provide a first current through the anticipating heater, a second circuit closed by shifting of the limiting means to second position, and including the relay operating means with the limiting means in second position, a third circuit closed upon operation of the relay switch, and including also the actuating means, closure of the second and third circuits being adapted to provide a second current through the anticipating heater greater than the first current established with the first circuit closed.

12. In a mechanism of the kind described for use with a heating means, an actuating means for the heating means, a space thermostat responsive to heat from the heating means, an anticipating heater for the thermostat, a limit switch for limiting operation of the heating means, said limit switch being adapted to close a first set of contacts when cold and a second set when hot, circuit means to effect operation of the actuating means upon closure of the thermostat, said circuit means including the first set of limit switch contacts, and circuit means including the second set of limit switch contacts for maintaining the anticipating heater in operation even when the limit switch opens the first circuit means to stop the actuating means.

13. In a mechanism of the kind described for use with a heating means for heating a space, a space thermostat in the space being heated, a second thermostat subjected to heat of the heating means to be actuated from a first to a second position when the heating means moves from below a predetermined temperature to above the same, a first circuit for the heating means including both thermostats, whereby if the space thermostat remains closed until the heating means exceeds the predetermined temperature the first circuit will open, and a second circuit for the heating means including the space thermostat in heat demanding condition to operate the heating means above said predetermined temperature if the space thermostat remains closed after the second thermostat shifts to second position.

14. In a mechanism for controlling operation of a heat-change producing device for producing heat changes in a space, a space thermostat in the space operable between closed and open positions, first apparatus for effecting operation of the heat-change producing means limited to a first and relatively low rate of heat-change production, second apparatus for effecting operation of the heat-change producing means at a second and relatively high rate of heat-change production, means responsive to initial closure of the space thermostat for effecting actuation of the heat-change producing means by said first apparatus, means responsive to closure of the space thermostat and operation of the heat-change producing means at said first rate for a predetermined time, for rendering the second apparatus effective to cause operation of the heat-change producing means at said higher rate, and means to limit the higher rate of heat production without rendering the second apparatus inoperative.

15. In a mechanism for controlling operation of a heat-change producing device for producing heat changes in a space, a space thermostat in the space operable between closed and open positions in response to space temperature changes, first and second thermally responsive devices operable at different temperatures, and disposed to be directly responsive to the temperature changes produced by the heat-change producing device, a first circuit including the space thermostat closed and the first thermally responsive device for effecting operation of the heat-change producing device within the temperature range of the space thermostat and the first thermally responsive device, a second circuit including the space thermostat closed and the second thermally responsive device for effecting operation of the heat-change producing device within the temperature range of the space thermostat and the second thermally responsive device, the last-named device requiring for its operation greater heat change than the first thermally responsive device, and means operated by closure of the space thermostat for a time interval longer than that required for the heat-change producing means to effect operation of the first thermally responsive device to effect closure of the second circuit.

16. In a control mechanism for use with a heat-change device, a space thermostat responsive to temperature conditions produced by the heat-change device, anticipating heater means at the thermostat, a limit switch for limiting the temperature of the heat-change device, means to operate the anticipating heat means at one heat generating capacity when the limit switch is closed, and means to operate the anticipating heat means at a greater anticipating heat generating capacity when the limit switch is opened in response to excessive temperature conditions of the heat-change device.

GEORGE D. BOWER.